United States Patent
James

(10) Patent No.: US 6,845,468 B2
(45) Date of Patent: Jan. 18, 2005

(54) AIRCRAFT FAULT MONITORING SYSTEM AND METHOD

(75) Inventor: Ian John Patrick James, Solihull (GB)

(73) Assignee: Lucas Industries Limited, London (GB)

( * ) Notice: Subject to any disclaimer, the term of this patent is extended or adjusted under 35 U.S.C. 154(b) by 589 days.

(21) Appl. No.: 09/852,926

(22) Filed: May 10, 2001

(65) Prior Publication Data

US 2001/0042229 A1 Nov. 15, 2001

(30) Foreign Application Priority Data

May 11, 2000  (GB) .............................................. 0011251

(51) Int. Cl.$^7$ ................................................ G06F 11/00
(52) U.S. Cl. ........................................ 714/25; 714/47
(58) Field of Search ........................... 714/25, 47, 707, 714/48, 706, 704

(56) References Cited

U.S. PATENT DOCUMENTS 6,158,021 A * 12/2000 Ziegler et al. ................ 714/25
6,553,518 B1 * 4/2003 Ware et al. ................... 714/704
6,560,725 B1 * 5/2003 Longwell et al. ............. 714/54

FOREIGN PATENT DOCUMENTS

JP        04101523        4/1992        .......... H04B/17/00

* cited by examiner

Primary Examiner—Scott Baderman
Assistant Examiner—Anne L. Damiano
(74) Attorney, Agent, or Firm—Ohlandt, Greeley Ruggiero & Perle

(57) ABSTRACT

A fault monitoring system comprises a fault detection mechanism to determine the status of a parameter to be monitored. An integrator counts in one direction when a fault in the measurement system is detected and counts in an opposite direction in the absence of fault detection. A threshold detector generates a hard fault indication when the integrator count reaches a threshold value, and an integrator count monitor generates information indicative of the state of the integrator count when below the threshold value thereby providing an indication of the progression of the fault.

15 Claims, 7 Drawing Sheets

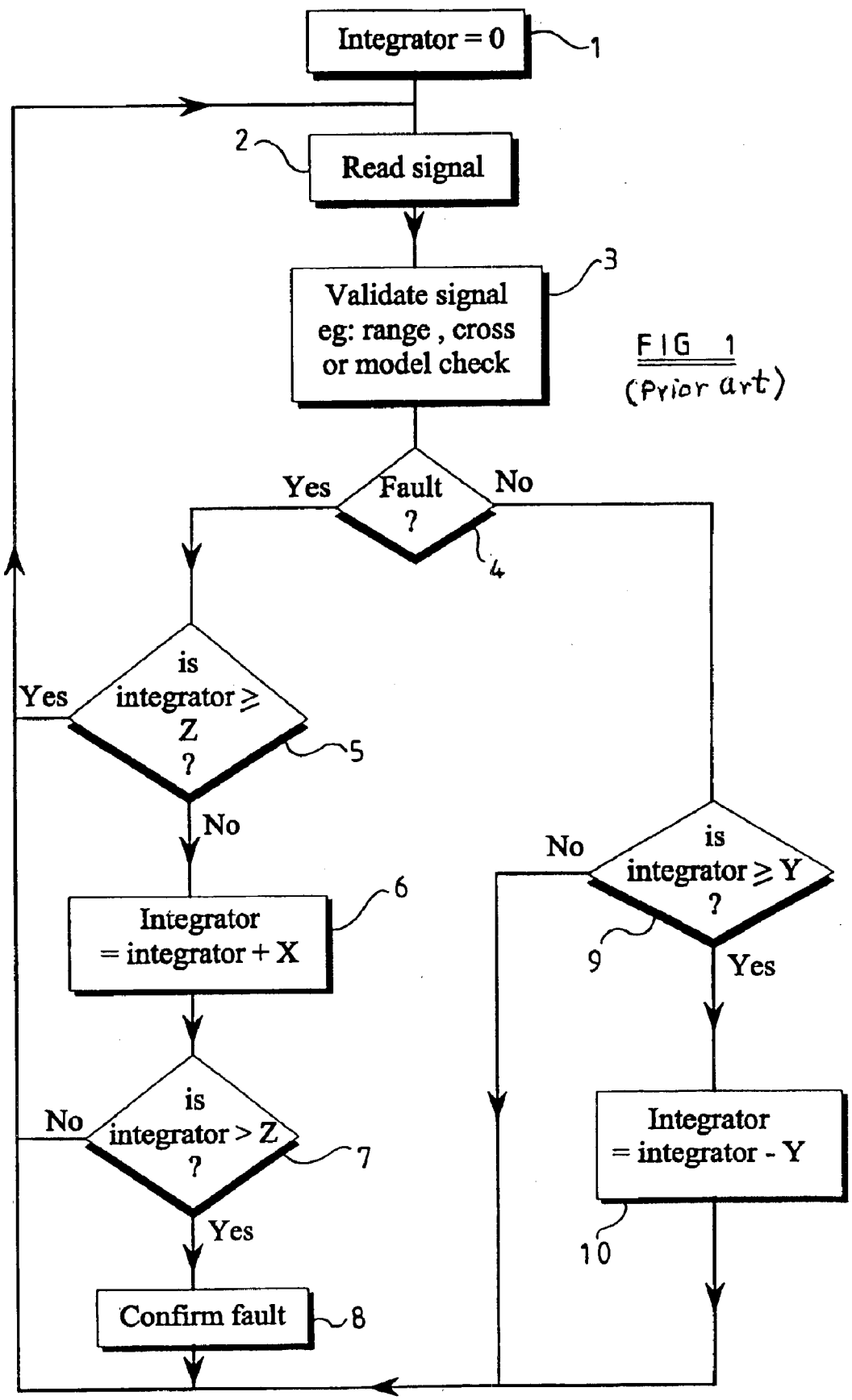

Classic hard fault (hard fault message)

Periodically intermittent - Long term fail rate < up / down ratio (no message)

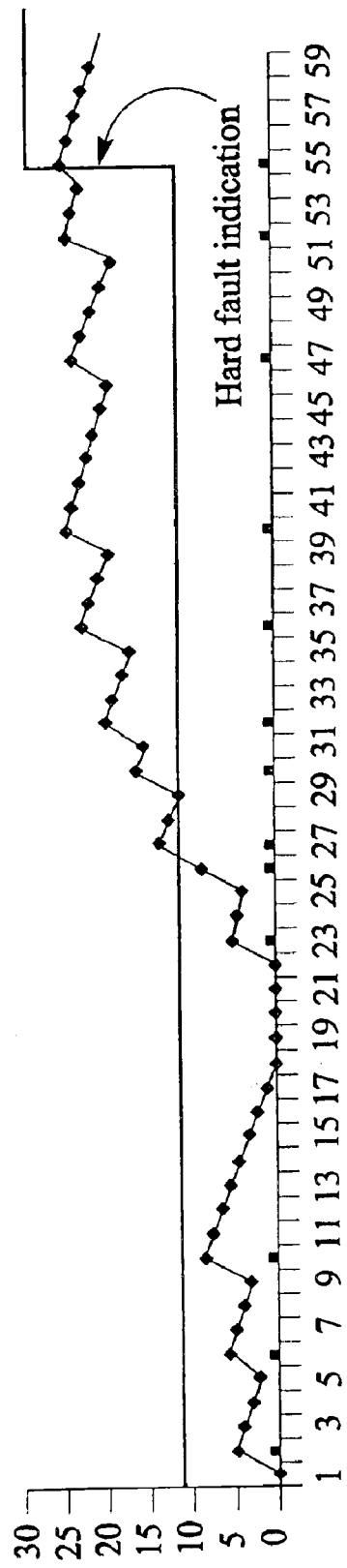
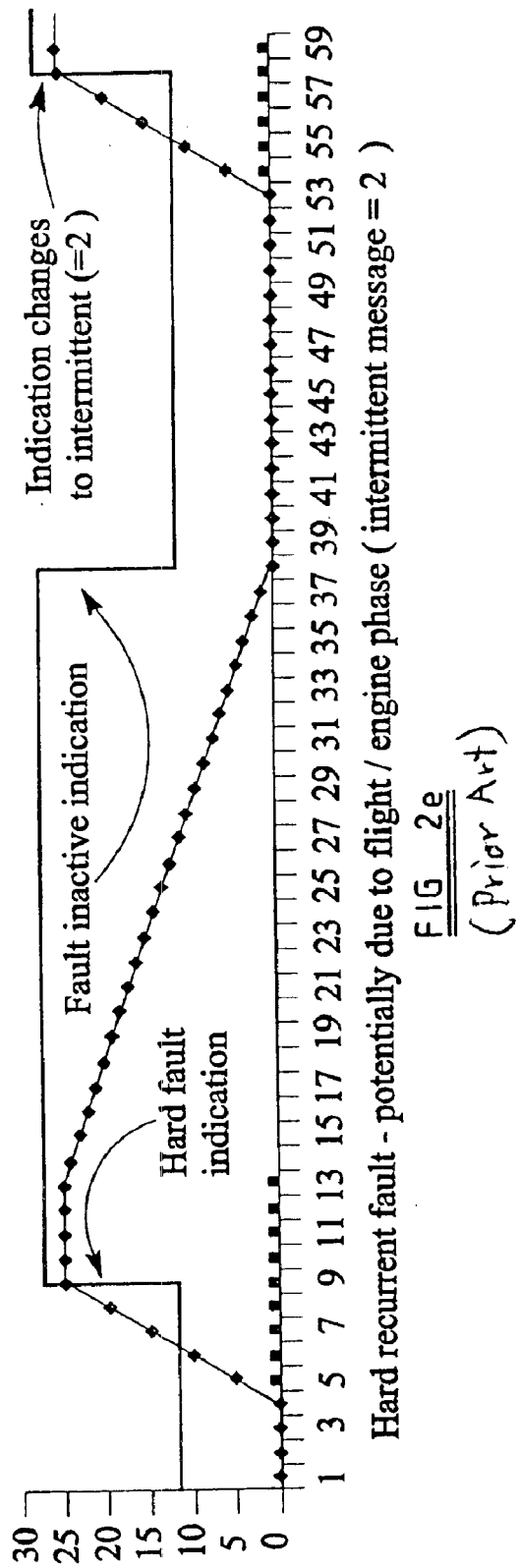

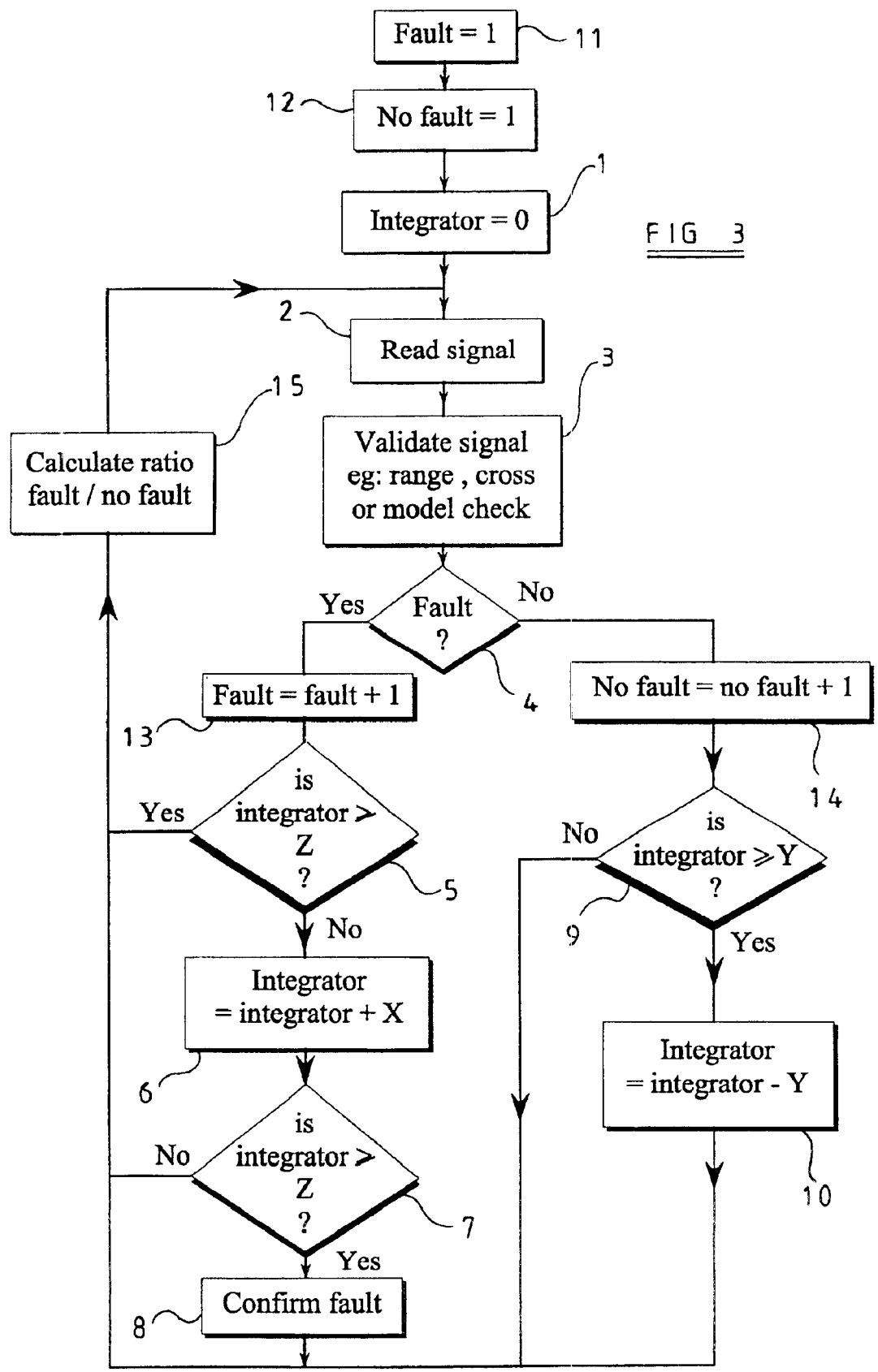

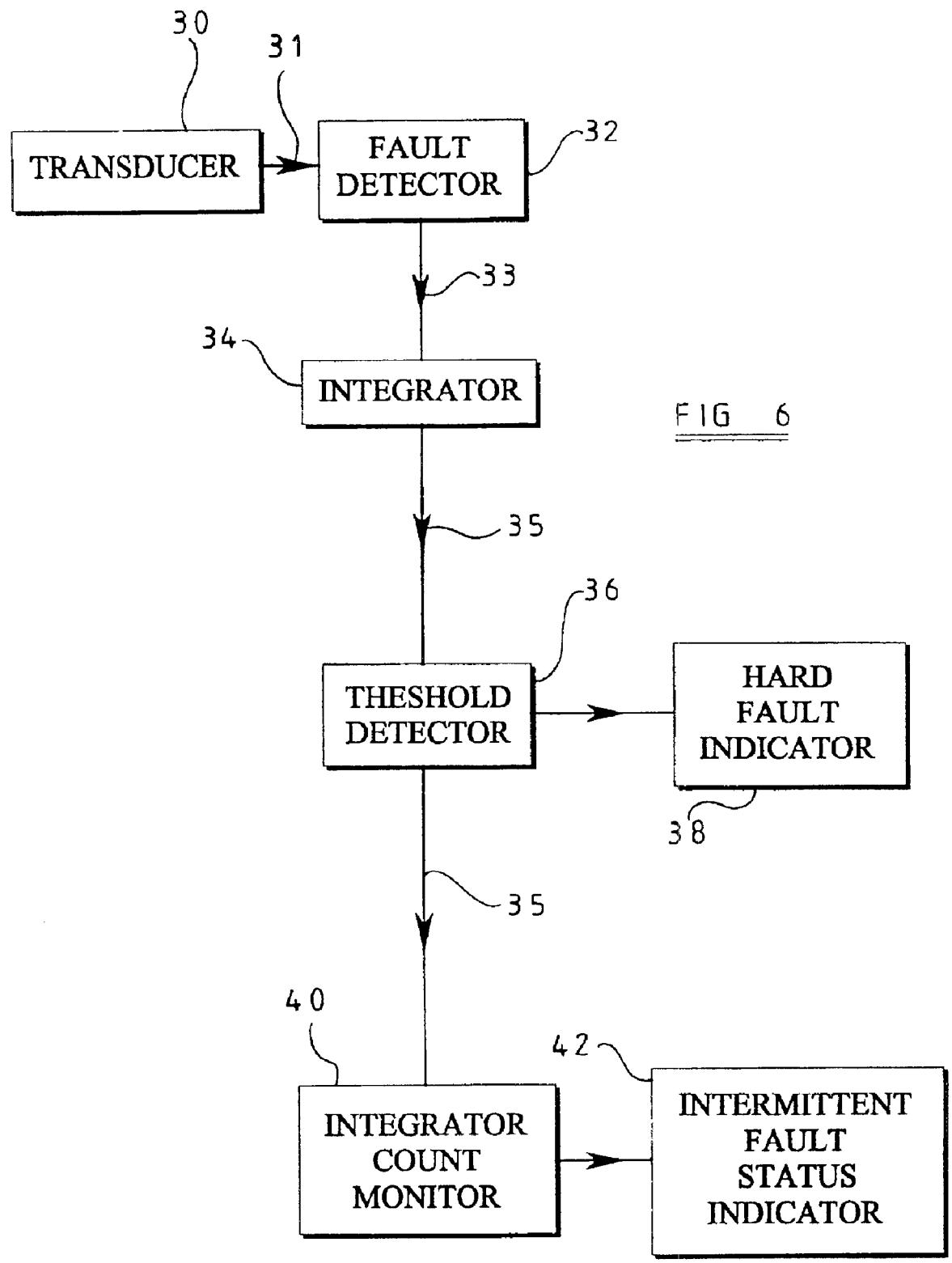

AIRCRAFT FAULT MONITORING SYSTEM AND METHOD

This invention relates to a fault monitoring system for providing an indication of the presence of faults detected in, for example, a system for monitoring operating parameters within an aircraft.

In a known fault monitoring system, in order to discriminate between intermittent and persistent or "hard" faults, an operating parameter is checked for the presence of a fault during successive sampling periods which may be, for example, at one second intervals. An integrator is provided which counts or ramps upwards towards a fault confirmation threshold every time a fault is sensed and counts or ramps downwards between sampling periods in which no fault is sensed. The integrator has an integration ratio which is such that for every upward count consequent on a fault detection, there are N fault free sampling periods for an equivalent downward count. For example, if a system has a fault confirmation threshold of 30, a sample rate of one second and an integration ratio of 1:50, a fault will be confirmed as a hard fault after 30 samples, i.e. 30 seconds. That is to say, the hard fault is confirmed once the integrator reaches a preset count or threshold, in this case 30. The system engineer can then investigate the fault in the knowledge that the fault has been declared "hard" and should therefore be reproducible/visible during fault isolation. Clearly, the fastest descent possible from the maximum count of 30 to zero in the case where successive samples are fault-free following confirmation of a "hard" fault, will take 30×50 seconds.

If the fault is intermittent, in which some sampled periods will indicate the presence of a fault while others will not, the integrator will count up and down according to the ratio of fault to non-fault sampling periods having regard to the integration ratio. Hence, an intermittent fault with a ratio of greater than one fault in 50 samples will eventually be confirmed as a hard fault. Depending on the degree of intermittency, the integrator may reach and move away from the preset count or threshold periodically. The system is therefore capable of registering such events as recurrent intermittent faults. Whether it does so, or registers them as confirmed hard faults depends on whether the fault is steady or periodically random. For example, in the case where the degree of intermittency is low, but not so low relative to the integration ratio that the integrator never reaches the preset count, the preset count threshold may only be reached after a long period of time. When reached, the system will indicate the presence of a confirmed hard fault even though the fault is essentially a very intermittent one. For an intermittent fault occurring less frequently than the integrator ratio, the integrator will never reach the preset count and no hard fault or intermittent fault will be confirmed by the system, ensuring that those faults that have no effect on the functionality are ignored.

Currently, the fault detection system may determine whether a fault is intermittent or persistent (hard) by counting the number of times that the integration count reaches a threshold value. If a count reaches a threshold only once then it is recorded as a hard fault and is flagged as such by the detection system. If the count reaches the threshold more than once then the fault is flagged as intermittent. Such a system has the disadvantage that the type of intermittency is not recorded. Also intermittent faults which take a considerable time to integrate to the threshold value may never reach the threshold a second time in order to be classified as intermittent and are therefore flagged by the system as hard. If the fault is classified as hard, the system engineer will expect the fault to be visible during fault isolation and as a consequence may reject the wrong component if unable to confirm a continuity fault. The problem is particularly seen in the case of thermocouple temperature sensors. These devices generate signals of the order of only a few mV and are therefore particularly prone to intermittent connection problems. With the increased functionality and complexity of modern electronic controllers comes an increase in the number of nuisance messages generated by low intermittency faults. These faults often have no system effect but result in the rejection of the electronic controller due to poor troubleshooting.

One solution to this could be to 'mask' the problem by increasing the thresholds at which an intermittent fault is registered as 'hard'. In the integrator system described previously, this could be done by increasing the integrator threshold from 30 to, say, 40. Any change to the fault integration system must be made in the knowledge that the system is tolerant to the fault for the period in which the fault condition is active prior to detection. This is often a very difficult analysis to complete.

It is an aim of the present invention to provide a fault monitoring system that can provide the systems engineer with a more robust system for determining and distinguishing between intermittent and hard faults. In particular, it is an aim of the present invention to provide the engineer with information about the nature of the intermittent fault which will permit him to make a more informed decision as to what, if any, action is required in response thereto. It is also an aim of the present invention to make this information available to the systems engineer prior to fault annunciation by the control system. The engineer will therefore have a basis for monitoring the 'general health' of the system being monitored on an ongoing real-time basis.

According to the present invention, there is provided a fault monitoring system comprising a fault detection mechanism to determine the status of a parameter to be monitored, an integrator for counting in one direction when a fault in the measurement system is detected and for counting in an opposite direction in the absence of fault detection, a threshold detector for generating a hard fault indication when the integrator count reaches a threshold value, and an integrator count monitor for generating information indicative of the state of the integrator count when below the threshold value thereby to provide an indication of the progression of the fault.

The counting in the one direction may be at a rate equal to or higher than the rate of counting in the opposite direction.

In embodiments of the present invention, it is possible to monitor the progress of the sensed faults prior to the generation of a hard or confirmed fault message. Consequently, embodiments of the invention have the advantage that they provide an indication of the state of health of the system being monitored. Embodiments provide for the monitoring of trends in the fault counts of intermittent faults enabling prediction of specific failure conditions. More particularly, by correlating the progression of the sensed faults with system operating parameters, it is possible to relate the sensed fault to possible causes. This enables provision of a fault diagnostic capability. For example, if the fault occurs only when vibration levels are high, which may be the case during take off of an aircraft, the fault indication could be indicative of an impending connector failure. Steps may be taken to remedy the fault before actual failure of the component. Other fault indications may arise which indicate conditions not likely to result in a degrading performance or system failure in which case the system engineer, armed with more information, can decide whether remedial action is appropriate.

In a preferred embodiment of the present invention, the integrator count monitor generates an indication of the ratio between the count in one direction and the count in the opposite direction for providing the information as to the progression of the sensed fault towards or away from a hard or intermittent fault condition. In this case, the ratio may be averaged over a predetermined period of time or for the duration of a specified system operating condition. For example, if the ratio of the integrator count in the one direction to the count in the opposite direction is only high during specific operating conditions of an aircraft, it is possible that the fault is indicative of a failure mechanism made apparent due to high levels of vibration at these times. The system may thus be provided with means for correlating the information generated by the integrator count monitor with system operating conditions and so provide fault status or diagnostic information in response to the correlation.

In an alternative embodiment to reduce the requirement for data transfer to a health monitoring system, the integrator count monitor may generate further indication dependent on the integrator count relative to a sub-threshold value, which is set below the nominal threshold value. In this case, the information indicative of the state of the integrator count may be any one of: the frequency with which the integrator count exceeds the sub-threshold value; the total time this sub-threshold value is exceeded; the maximum continuous period the integrator count exceeds the sub-threshold. As with the first embodiment, the information indicative of the state of the integrator may be correlated with operating phases of the system and the system may be operative to generate appropriate system health messages.

The invention will now be further described by way of example with reference to the accompanying drawings in which:

FIG. 1 is a flow chart with reference to which a prior art fault monitoring system will be described;

FIGS. 2b to 2e show, for illustrative purposes, four different fault scenarios according to a different integrator count regime from that of FIG. 2a;

FIG. 3 is a flow chart with reference to which a first embodiment of the invention will be described;

FIG. 6 is a schematic diagram showing the system components of an embodiment of the present invention.

A prior art fault monitoring system comprises an integrator which counts upwardly towards a threshold value (see Z of FIG. 2a) each time a fault is detected during a sampling period. The prior art fault monitoring system is initialised with the integrator value at zero as indicated in step 1 of FIG. 1 and shown as point A in FIG. 2a. The system reads at step 2 a signal received from a transducer providing a measure of the input parameter being monitored. At step 3, the received signal is validated using one or more fault detection methods. Range checks, cross-checks and model checks are often used in combination to ensure high integrity fault detection. Step 4 determines whether the received signal is indicative of the existence of a fault. If a fault is identified at step 4, a check is made at step 5 to see whether or not the integrator count is greater than or equal to the threshold Z. If the integrator count is greater than or equal to the threshold value Z, then an affirmative indication Y restarts the signal check routine. In this way, the fault count is prevented from exceeding the threshold. If the integrator count is less than Z, the integrator count is upwardly incremented at step 6 by a value X equivalent to the up-count of the integrator. At step 7, the upwardly incremented count value is checked again whether it is greater than or equal to the threshold value Z. An affirmative result is confirmed as a hard fault at step 8 otherwise the incremented integrated count value is stored and the routine restarted to check the presence of a fault in the next sample. In the next sample, it is possible that step 4 determines the absence of a fault, in which case the system is operative at step 9 to check whether the current indicator count value is greater than or equal to the down count value Y. If the integrator count value is currently not greater than or equal to the down count value Y, then in order to avoid a negative count, the system routine is restarted in readiness for the next signal sample. On the other hand, if at step 9 the current integrator count value is determined as being greater than or equal to the down count Y, then the integrator count value is decremented by Y at step 10.

Figure 2A:
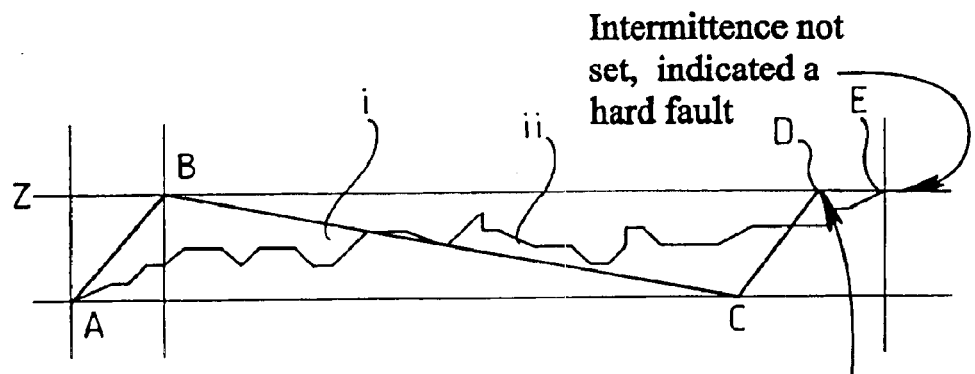
FIG. 2a is a graph illustrating the integrator count for two different fault scenarios in the prior art system of FIG. 1.

FIG. 2a illustrates two possible count profiles for the system described with reference to FIG. 1. In this system, the integrator has an integration ratio of 1:50 and a threshold value Z of 30. If the signal sampling is at the rate of one sample per second (see count profile i of FIG. 2a), then the minimum time it takes the system to confirm a fault is 30 seconds, that is to say the time for the count to move from point A of FIG. 2a to point B. The integration ratio of 1:50 means that there must be 50 no-fault samples to achieve an equivalent downward count. In this case, the minimum time for the integrator to return from the threshold value B to zero at point C of FIG. 2a is 30×50 (i.e. twenty five minutes). In this example, the transducer being monitored causes the integrator to meet the threshold value Z for a second time at point D. The fault monitoring system recognises the return of the integrator count value to the threshold value Z as an intermittent fault. The system therefore indicates the fault profile represented by the count profile i as a recurrent hard fault.

An alternative fault scenario is indicated by the count profile ii of FIG. 2a. In this case, the fault occurs for considerably shorter periods, i.e. it is more intermittent, but the ratio between fault and non-fault samples relative to the integrator ratio is such that over a long period of time the threshold Z is reached as indicated at point E of FIG. 2a. In this case, the system indicates the presence of a hard fault even though the fault is essentially a very intermittent one. The prior art fault monitoring system therefore suffers from the disadvantage that it is not possible to distinguish properly between hard faults, hard recurrent faults and periodic intermittent faults.

Figure 2B:
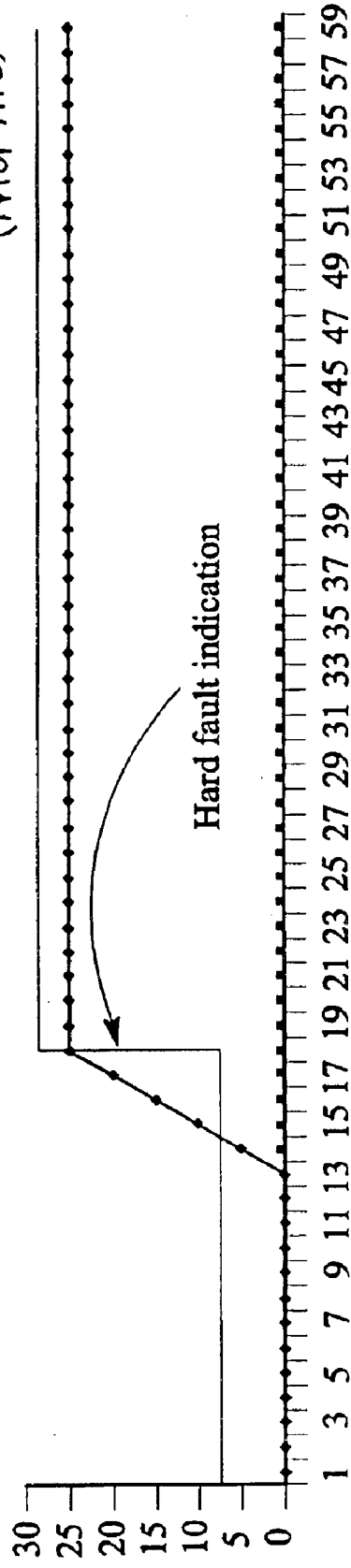
Figure 2C:
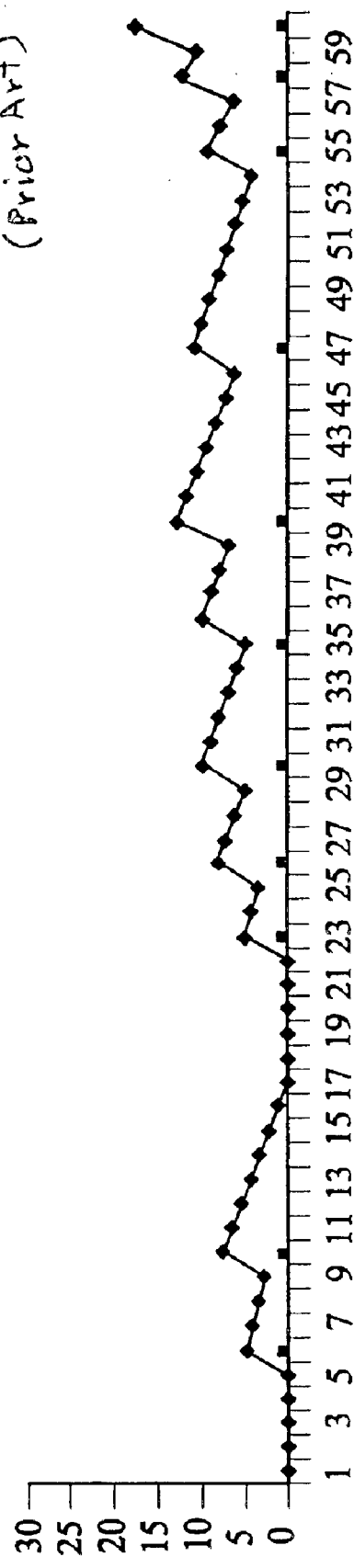

In FIGS. 2b to 2e, the integrator count is set for illustrative purposes so that there is an upward count of 5 for every fault sample and a downward count of 1 for every fault free sample. These figures illustrate four different fault scenarios respectively. In FIG. 2b, a situation where a fault is permanent, i.e. 'hard', is indicated. In FIG. 2c, a situation where the fault is periodically intermittent over the long term is indicated but the character of the fault is such that the threshold is not reached. In this case, the system does not indicate the presence of a fault. FIGS. 2d and 2e illustrate two different intermittent fault scenarios which prior art systems cannot distinguish between. Both intermittent fault scenarios are such that the threshold is reached and the system indicates the presence of a fault. However, in the case of FIG. 2d, the nature of the fault is such that it is intermittent over the long term, resulting in a hard fault indication. In contrast, the nature of the fault giving rise to the count profile illustrated in FIG. 2e is such that it occurs persistently during particular engine operation phases only rather than consistently over the long term. This scenario is indicated as an intermittent fault.

The flow chart of FIG. 3 illustrates an embodiment of the invention in which the fault monitoring system is provided with means for measuring the trend of the integrator count towards and away from the threshold value. The fault monitoring system of FIG. 3 performs similar steps to those described with reference to FIG. 1 except that in steps 11 and 12, an absolute fault and no fault count is initiated and incremented at steps 13 and 14 depending on whether or not a fault is determined at step 4. The ratio between the cumulative number of faults counted at step 13 to the cumulative number of non-faults counted at step 14 is calculated at step 15. It is therefore possible to record the trend in the ratio of the fault periods against the number of fault-free periods. This data trend is capable of indicating a worsening fault situation in which a hard fault would eventually be indicated by the system. The system may be operative for calculating the ratio of fault periods against non-fault periods over an entire operating sequence, for example an entire aircraft flight. In this case, the result would indicate the overall health of the parameter under review. A different type of indication such as a ratio of failures during a particular flight condition, such as take-off or descent may highlight transient effects such as vibration or temperature changes, which are more likely to be a factor influencing the generation of faults. The number of samples used to calculate the fault to non-fault ratio is a matter of design choice depending on the diagnostic objective and computing performance available.

Figure 4:
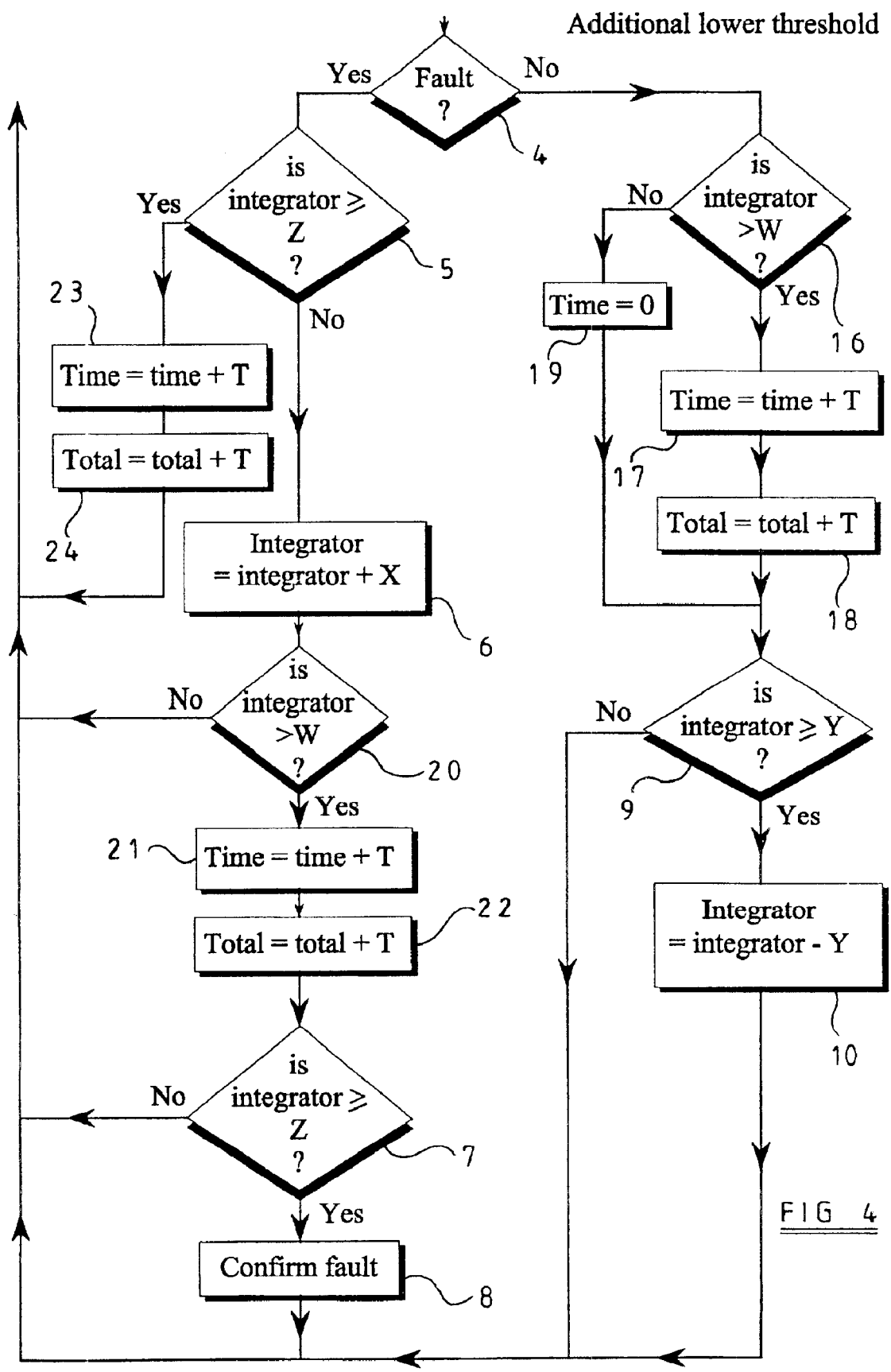
FIG. 4 is a flow chart with reference to which a second embodiment of the present invention will be described.

An alternative embodiment is described with reference to FIG. 4, with similar steps to those of FIGS. 1 and 3 and bearing similar reference numerals. In this case, only the steps leading from decision box 4 are shown in FIG. 4 to highlight the differences between this method and that illustrated by FIG. 3. In this alternative embodiment, instead of determining the ratio or gradient between upward and downward counts, the system is operative for providing an indication of the degree to which the integrator count value exceeds a lower integrator threshold or sub-threshold W (see FIG. 5). In this embodiment, if no fault is sensed at decision box 4, it is determined at step 16 whether the integrator count is greater than the sub-threshold value W. If the result in step 16 is affirmative, a record of the time that the integrator count remains continuously above the threshold W is increased at step 17. At step 18, a count representing the total time the count is above threshold W is increased. In the event that the integrator count is determined at step 16 to have fallen below the sub-threshold W, the count is reset to zero at step 19. The system then proceeds to check at step 9 whether the integrator count can be decremented at step 10 as previously described with reference to FIG. 1.

In the event that a fault is confirmed at step 4, the system determines at step 5 whether the integrator count is greater than or equal to the fault confirmation threshold Z as described hereinbefore with reference to FIG. 1. If the integrator count is greater than or equal to the threshold Z then the system increments "the time above the sub-threshold W" and the "total time above the sub-threshold W" at steps 23 and 24. If the integrator count is not greater than or equal to the threshold Z at which a hard count is indicated, the integrator count is incremented at step 6 as hereinbefore described but there is a subsequent determination at step 20 as to whether the integrator count is greater than the sub-threshold W. If the count is greater, then the system increments the "time above the sub-threshold W" period and "total time above the sub-threshold W" as indicated at steps 21 and 22 in a similar manner to that described hereinbefore in the case where no fault is detected in the system of FIG. 4.

Figure 5:
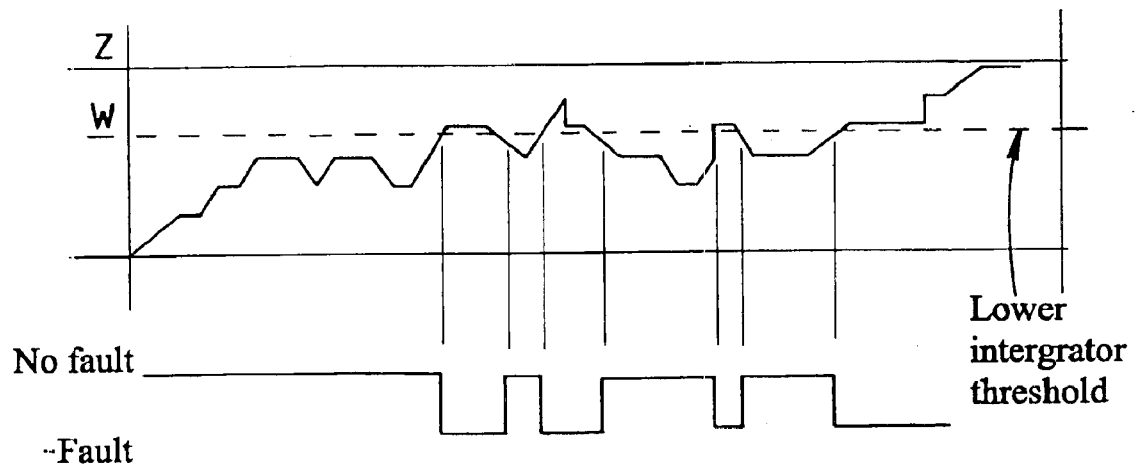
FIG. 5 is a graph showing the progression of integrator counts in the embodiment of FIG. 4.

As illustrated in FIG. 5, the system is capable of providing a signal indicative of the total time the sensor fault count exceeds the sub-threshold W and also the time of each period that the fault count exceeds the threshold. These values may be used to give an indication of the general trends in intermittent faults before they become registered as hard faults on reaching the threshold Z. These data trends may be established by analysing the time periods calculated by the method illustrated by FIG. 5, in different ways. For instance, the maximum continuous period above the sub-threshold W may be used, or the total time above this threshold. It is also possible to monitor the frequency of periods above the sub-threshold. An advantage of the embodiment described in FIG. 5 is that the system provides an output indicative of the state of the system being sensed, while reducing the requirement for transferring an excessive quantity of data to be processed. The data trends determined may be correlated against the total flight time of an aircraft or with individual flight phases such as take-off or landing or flight events such as deployment of undercarriage, or other maintenance messages which may be received from health monitoring systems.

FIG. 6 illustrates schematically the components that make up the fault monitoring system for performing the functions described above. A transducer 30 provides a signal 31 indicative of an input parameter being monitored to a fault detector 32. Fault detector 32 is operable for sampling the signal 31 at predetermined time intervals and, for each sample, determines whether the signal 31 is indicative of the existence of a fault. For each sample, fault detector 32 provides a fault signal 33, indicating either the existence or absence of a fault, to an integrator 34. Integrator 34 counts the signal 33, according to the method described above and provides a count signal 35, indicative of the current value of the count, to a threshold detector 36. Threshold detector 36 determines whether the current value of the count has a reached a predetermined threshold, and, if it has, provides a signal to a hard fault indicator 38 to indicate the existence of a hard fault.

If the threshold detector 36 determines that the count has not reached the threshold, the count signal 35 is read by an integrator count monitor 40. Integrator count monitor 40 determines, in accordance with any of the methods described above, a fault status and provides a signal to a fault status indicator 42 for indicating the current status of the fault.

It will be appreciated that components of the system described in FIG. 6 may be implemented in hardware or within a computer or microprocessor in software.

What is claimed is:

1. An aircraft fault monitoring system comprising:
   a fault detection mechanism for providing a fault status indication of a monitored discrete aircraft operating parameter;
   an integrator for incrementing a count in one direction by a predetermined fault increment when the fault detection mechanism provides a fault indication in relation to said parameter, and for incrementing said integrator count in an opposite direction by a predetermined no-fault increment in the absence of fault detection;

a threshold detector for generating a hard fault indication when the integrator count reaches a threshold value in relation to said parameter;

a sub-threshold detector for generating a further fault indication in relation to said parameter when the integrator count lies between the threshold value and a sub-threshold value set below the threshold value;

an integrator count monitor for generating information indicative of the state of the integrator count when between the threshold value and the sub-threshold value, thereby to provide an indication of a non-hard fault condition in relation to said parameter; and a correlator for correlating said information generated by the integrator count monitor with system operating parameters so as to provide a fault status or a diagnostic in response to the correlation.

2. The system of claim 1 wherein the predetermined fault increment is greater than or equal to the predetermined no-fault increment.

3. The system of claim 1 wherein said information indicative of the state of the integrator count is the frequency with which the integrator count exceeds the sub-threshold value.

4. The system of claim 1 wherein said information indicative of the state of the integrator count is the total time said sub-threshold value is exceeded.

5. The system of claim 1 wherein said information indicative of the state of the integrator count is the maximum continuous period the integrator count exceeds said sub-threshold value.

6. The system of claim 1 wherein the correlating means is operative for correlating said information indicative of the state of the integrator with operating phases of the system and for generating appropriate system health messages.

7. The system of claim 1 wherein the integrator count monitor is operative to generate an indication of the ratio between the count in the one direction and the count in the opposite direction for providing information as to the direction of the progression of the sensed fault relative to a hard fault condition.

8. The system of claim 7 wherein the predetermined fault increment is greater than or equal to the predetermined no-fault increment.

9. The system of claim 7 wherein the ratio is an averaged ratio over a predetermined period of time.

10. The system of claim 7 wherein the ratio is an averaged ratio for the duration of a specified system operating condition.

11. A method of providing an indication of the progression of a discrete aircraft operating parameter a fault, the method comprising: monitoring said parameter to detect the fault; incrementing an integrator count in one direction when the fault is detected; incrementing the integrator count in an opposite direction in the absence of fault detection; generating a hard fault indication when the integrator count reaches a threshold value; generating a near hard fault indication when the integrator count exceeds a sub-threshold value; and generating information, in respect of said parameter, indicative of a non-hard fault condition when the state of the integrator count is between the threshold value and the sub-threshold value.

12. The method of claim 11 further comprising correlating said information indicative of the state of the integrator count with system operating parameters; and providing a fault status or diagnostic in response to the correlation.

13. The method of claim 11 wherein generating information indicative of the state of the integrator count includes generating an indication of the ratio between the count in the one direction and the count in the opposite direction thereby providing information as to the direction of the progression of the sensed fault relative to a hard fault condition.

14. The method of claim 13 wherein generating an indication of the ratio between the count in the one direction and the count in the opposite direction includes averaging the ratio over a predetermined period of time.

15. The method of claim 13 wherein generating an indication of the ratio between the count in the one direction and the count in the opposite direction includes averaging the ratio for the duration of a specified system operating condition.

* * * * *